Patented May 29, 1951

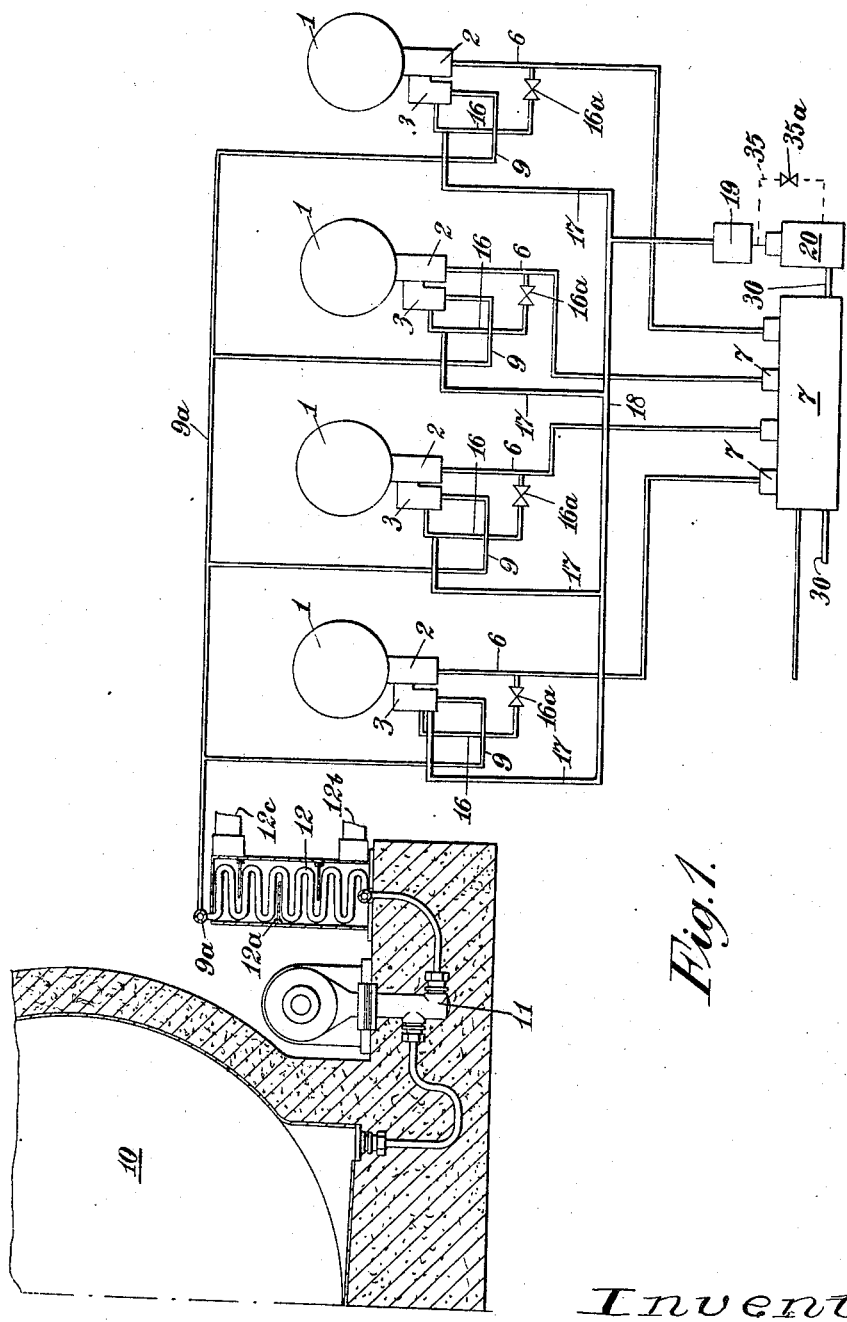

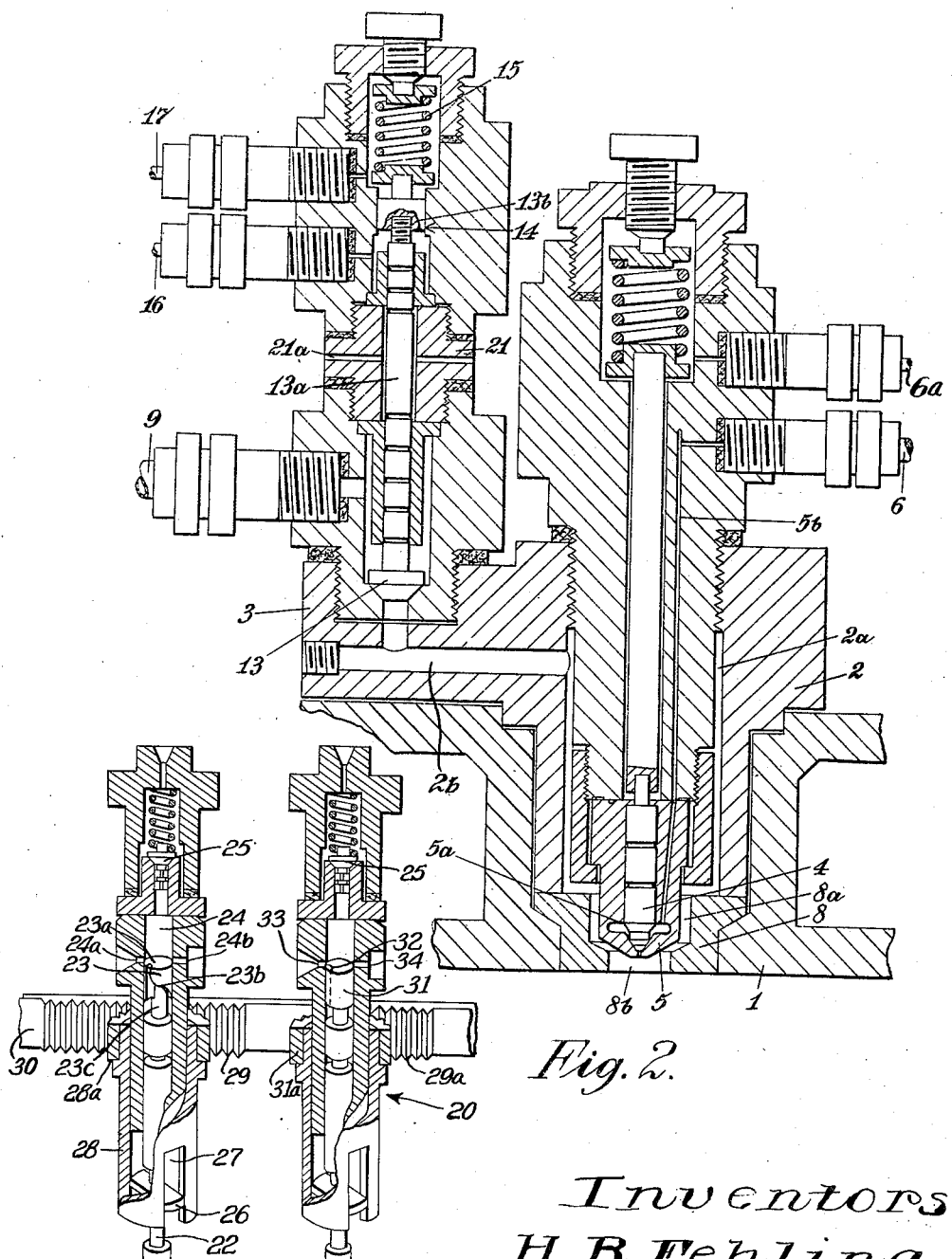

2,555,029

UNITED STATES PATENT OFFICE 2,555,029

INTERNAL-COMBUSTION ENGINE

Hans Reinhard Fehling and Gerhard Friedlander, London, England

Application May 16, 1946, Serial No. 670,149
In Great Britain May 18, 1945

5 Claims. (Cl. 123—1)

This invention relates to internal combustion engines and to methods and means for operating such, and embodies the principle and method of operation described in prior Patent Specification No. 2,376,479.

The total load which an aircraft can lift off the ground is limited, among other factors, by the maximum power which its engines are capable of developing during the take-off period. Apart from this very short period and certain emergencies, the power required during cruising is far less. The necessity of economy, both in structural weight and fuel, during cruising, therefore, imposes strong limitations on the maximum power which can be made available for take-off purposes without increasing either the weight of the engines or their fuel consumption beyond the economic limit. Similar conditions exist in other fields on land and sea where structural load in reference to normal power output required is a decisive factor.

The present ratio of cruising power (conditions giving minimum fuel consumption) and take-off power (maximum permissible power) is about 1:2. It is an object of the present invention to widen this margin very appreciably without affecting the most economic conditions obtainable for cruising.

It is further known that, in spite of many advantages, e. g. the very low fuel consumption, the development of compression ignition internal combustion engines for aircraft has been hampered because their weight/power ratio exceeds that of spark ignition gasolene engines. It is a further object of this invention to provide a method and means of operation of substantially normal strength and weight according to present-day design and practice, in which the power output range is very substantially raised over and above the normal rated output of the designed engine without increasing the cycle mean temperatures or the maximum cylinder pressures; and in particular the aim of the invention is to provide a solution of the problem indicated in the preceding paragraph in respect to compression ignition internal combustion engines.

A further object of the invention lies in improving the condition of combustion in compression ignition internal combustion engines capable of operating in power output ranges in excess of the normal range for which the engine is designed.

The invention consists in a method of operating an internal combustion engine of the two or four-stroke cycle type to provide a normal power output range under normal working requirements or conditions and, as required, a very substantially increased power output range with a maximum far in excess of said normal range, comprising: admitting in the usual and known manner, air (or an air/fuel mixture) to the cylinder of the engine and compressing the charge on the compression stroke at compression ratios according to normal practice, under all conditions; and, for increasing the power output range, injecting increased quantities of fuel and injecting oxygen under pressure as a supplemental combustion agent at or about top dead centre in quantities in relation to the fuel calculated to effect substantially incomplete combustion thereof.

By "substantially incomplete combustion" is meant controlled combustion such that the oxygen present is in substantially insufficient quantities to support complete combustion of the fuel and such that the exhaust products are composed mainly of the diatomic gases carbon monoxide and hydrogen. The condition when the engine is operating with increased quantities of fuel with oxygen injection as stipulated above may be hereinafter conveniently referred to as "supercharging."

From the theoretical point of view oxygen derived from any source is suitable but practical considerations make it desirable, if not essential, that oxygen gas derived from liquid oxygen should be employed as not only is liquid oxygen the most conveniently stored source but it affords combustion agent gas readily available at the required pressure without having to spend a large fraction of the engine power on its compression.

The invention also comprises means adapted to carry out the above method including an oxygen injection device or a combined fuel and oxygen injection device and means for controlling the quantity of oxygen in relation to the fuel and the instant of its injection in the cycle.

It is preferred to employ according to the invention a combined fuel and oxygen injection device having a fuel injection valved nozzle of the solid fuel injection type and a housing adjacent the apex of the injection cone coupled to the oxygen supply for injecting the oxygen into the atomised fuel.

The attainment of increased power output range, according to the invention, necessarily involves the expenditure of great quantities of fuel but as this output is called for only over limited periods and not for normal operation, this excess expenditure of fuel is temporarily and more than compensated for by the advantages achieved.

It will be appreciated that the residual exhaust gases leaving the cylinder contain a certain amount of combustible gases due to incomplete combustion, and it may be thought that, in two-stroke engines operating according to the invention, the scavenging air following up the exhaust gases may lead to the completion of combustion or explosion of some of said gases. It has, however (particularly in high speed engines), been found that owing to the limited rate of flame propagation, either this does not take place or if it takes place the extent is insignificant from any objectionable point of view.

Should it be desired to suppress any flame propagation in a two-stroke engine, such as referred to above (for large low speed compression ignition engines for example) the admission of the scavenging air charge may be slightly delayed or preceded by a charge of inert gas such as ordinary combustion gas, carbon dioxide or steam, which operates as an insulating stratum between the exhaust gases and the incoming air. This inert gas may be stored under pressure and be injected into the cylinder through the inlet port or inlet valve immediately after the inlet port has been uncovered by the piston or the inlet valve starts to lift.

In the accompanying drawings:

Fig. 1 is a diagram illustrating the application of the invention by way of example to a four-cylinder, four-stroke compression ignition engine.

Fig. 2 is a sectional elevation of a solid fuel injection nozzle combined with an oxygen admission valve operating according to the invention, and Fig. 3 is a sectional elevation of one fuel pumping unit of the fuel pump indicated diagrammatically in Fig. 1 and an associated control pump for the oxygen supply, together with a master rod for controlling the operation of the fuel pumps and the control pump under normal and supercharging conditions.

In carrying the invention into effect according to one mode as described by way of example and illustrated diagrammatically in Fig. 1, as applied to a four-stroke compression ignition internal combustion engine, an engine of normal design and weight according to present-day practice is provided with the usual supply means for providing combustion air charges to the cylinders on the suction strokes so that such as compressed in the normal manner on the compression stroke. The ratio of compression may be any normal ratio, i. e. about 1:12 to 1:18, and the cylinder head need not be provided with a precombustion mixing chamber. Referring to Fig. 2 in or adjacent each cylinder head 1 a fuel injection device 2, which in this instance is combined with a controlled oxygen inlet valve casing 3, is mounted, and as these are duplicates one of the other, one only will be described. The fuel injection component comprises a spring loaded fuel injection valve 4 seated in a nozzle 5 and having a compartment or clearance 5a adjacent or around the base of the valve to which fuel under pressure is supplied through the duct 5b and pipe line 6 from a fuel pump 7, according to ordinary practice, and the device, in general, may be according to any of the well known solid fuel injection types. The usual fuel leak-off stud is provided at 6a.

The sleeve or tubular housing of the valve stem through which the fuel passage 5b may lead, is surrounded by a cylindrical clearance 2a in the injection device housing or casing 2 attached to the cylinder head. This clearance may have slotted or perforated distance rings or a helical partition or flange providing a corresponding helical passage (not shown in the drawing) to induce a swirl component in the oxygen injection when it passes across the fuel injection cone. The lower end of this clearance communicates with a corresponding clearance 8a in a conical or other annulus 8 having an apex injection orifice 8b coaxial with the injection valve and fuel nozzle 5. This annulus 8 is preferably made of heat resisting steel to withstand the high temperatures which may be encountered, for example during normal (i. e. unsupercharged) operation when the annulus is not cooled by the oxygen flow. Into the clearance 2a a duct 2b enters which is connected to a valve controlled oxygen supply device 3, the arrangement being such that entering oxygen is directed from the clearance 8a across the apex of the atomised fuel injection cone as it emerges from the fuel nozzle 5 with a view to causing a thorough mixing of the oxygen and atomised fuel in the injection period or a suitable proportion thereof during the conditions when oxygen is required for the operation of the engine according to the invention.

The oxygen connection of the device is by pipe line 9 coupled with a manifold 9a for a gas supply derived from a liquid source of oxygen, which comprises a reservoir or heat insulated cylinder 10 of liquid oxygen, a pump 11 delivering to a heat exchange coil or like element 12 coupled to the pipe 9a and surrounded by a heating jacket 12a which may be heated in any suitable manner by the circulation of heating fluid through conduits 12b, 12c, or electrically. The heat exchange coil is adapted to vaporise the liquid oxygen and the supply of oxygen for the fuel injection device may pass through a gas holder and the pressure may be regulated by any pressure regulating device or the operating means for the pump 11 may have a device for controlling the pressure. Manually operable means are provided for causing the engine to operate for the normal power range and for changing the operation to the supercharging condition to afford the increased range as may be determined at will. Means of suitable known type may be provided controlling the instant of injection of fuel which may also control the instant of injection of oxygen, or separate means may be provided for controlling the instant of injection of the oxygen in synchronism with the period of fuel injection or the desired proportion thereof. Similarly, control means are provided for regulating the quantity of fuel for normal running and for the quantity required for the increased range, and the control for the increased output of fuel may be linked or interconnected with means adapted to adjust the quantity of oxygen admitted to the required ratio to ensure substantially incomplete combustion.

According to the preferred arrangement the admission of oxygen to accord with the supercharging conditions to the duct 2b and clearance 2a is controlled by a valve 13, the stem 13a of which has a piston 13b operating in a cylinder 14 and having a loading spring 15. The inner end of the piston 13b is subjected to the pressure in the fuel line 6 through a branch 16 provided its stop valve 16a is open such that during each injection period the valve 13 tends to open and admit oxygen to the clearances 2a, 8a, thus ensuring oxygen injection synchronised with fuel injection when the engine is intended to operate under the supercharging conditions, but oxygen is prevented from passing to the fuel nozzle when the engine is under normal fuel injection and running conditions as explained below. The valve opening pressure through connection 16 is counteracted by pressure acting on the top of the piston 14 supplied through the pipe 17 having a manifold connection 18 to the reservoir 19 of a control pump 20 which for convenience utilises, for the required hydraulic pressure, the fuel oil supply for the engine. When oxygen is not to be supplied the valve 13 is held closed by the pressure from pump 20 together with the oxygen pressure on the valve plus that of the loading spring 15.

In order to prevent the leakage of oil along the stem of the valve 13 into the chamber behind the valve, the stem is surrounded by a cavity in a block 21 which communicates with atmosphere through the drain ducts or ports 21a.

The provision of the stop valve 16a in the by-pass 16 is fitted as a precautionary measure so that the oxygen valve 13 cannot inadvertently be opened. The stop valve may be any known type of solenoid valve which is opened when electrically energised by the actuation of a manual switch or one interlocked with throttle or other control means employed for the engine so that when the engine is operating under normal conditions oxygen cannot inadvertently be admitted, while when the change over to supercharging and oxygen supply is required to take place, the valve is opened automatically. For example, the switch may be operated by a connection with the master rod or lever referred to below for adjusting the fuel pump 7 and control pump 20.

The fuel pump may be of any of the known types suitable for solid fuel injection. For example it may be of the type comprising a reciprocating and partial rotary plunger. A pump of this type is shown in Figure 3 and will be recognised by those skilled in the art as one in general use for fuel injection in ignition compression engines. The control pump 20 is of a similar type modified to suit the particular function of this pump as described hereinafter.

In Fig. 3 is illustrated in section one of the fuel pump units 7 together with the adjacent control pump unit 20. The stem 22 of the pump plunger terminates in a cam follower or tappet actuated by a cam in known manner against the force of a strong compression spring (not shown). The pump plunger 23 is mounted in the cylinder 24 for partial rotation about its axis and has a longitudinal idling groove 23a registrable with fuel suction ports 24a and a helical shoulder 23b and cavity 23c communicating with the longitudinal groove, whereby the duration of injection is adjustably determined according to the degree of rotation imparted to the plunger in reference to the fuel port 24b on the plunger.

The pump plunger 23 is mounted in the cylinder 24 for reciprocation and partial rotation about its axis, the latter being for adjustment of the duration of the injection period and hence the quantity of fuel injected. The plunger has a longitudinal groove 23a communicating with the upper part of the cylinder 24 and having an adjoining helical shoulder 23b which bounds the upper side of the annular cavity 23c into which the groove 23a opens laterally.

Inlet or suction ports 24a, 24b are formed in the wall of the cylinder 24 and communicate with the common suction chamber of the pump (not shown).

The helical wall of the shoulder 23b cooperates with the port 24b in determining the effective length of the pressure or delivery stroke of the pump and the duration of injection is adjustably determined according to the degree of rotation imparted to the plunger and its shoulder 23. When the shorter part of the shoulder is turned opposite the port 24b the injection period will be at the minimum while as the plunger is turned to bring the longer part into register the injection period is correspondingly increased. For the present invention in order to supply additional fuel for the increased power range, a pump plunger having an adequately long stroke is employed so that the port 24b is uncovered later.

For imparting rotation to the plunger and adjusting the helical shoulder 23b a cross-piece 26 is provided on the valve stem and slidably engaged in slots 27 in a sleeve 28 rotatably mounted on the cylinder 24. This sleeve has a pinion or toothed segment 28a meshing with a rack 29 on a master rod 30 which is similar to the toothed rack member commonly provided on this type of pump and connected to a lever actuated by the operator or governor mechanism but in the present instance this rack member is modified as described below for the purpose of extending its operation to the setting of the helical shoulder of the plunger of the hydraulic control pump 20.

The control pump 20 shown on the right-hand side in Fig. 3 of the fuel pump described above is precisely similar to that pump with the exception that it does not possess the helical shoulder 23b. The plunger of this pump is designated by the reference 31 and its longitudinal groove is indicated at 32. The pinion or segment of the plunger 31 shown at 33 meshes with a second rack 29a on an extension of the master rod 30. The suction port 33 and port 34 of the pump 20 are connected to the fuel supply, as in the present example the fuel of the system is utilised as a hydraulic medium for controlling the oxygen valve 13. The delivery side of the pump 20 beyond the non-return valve 25 is connected by a by-pass 35 to the suction side of the pump. The by-pass 35 has a restricted orifice 35a.

The relative adjustments of the racks 29 and 29a with respect to the pinions of the fuel pumps 7 and control pump 20 are such that for all rotary adjustments of the plunger 23 and shoulder 23b required for normal (non-supercharged) running of the engine, the longitudinal groove 31a of the plunger 31 of the control pump 20 is out of alignment with the suction port 33, and the pump 20 supplies pressure via the reservoir 19 and lines 18, 17 to the outer end of the piston 13b (Fig. 2) maintaining the oxygen supply valve 13 closed against the pressure pulsations in the fuel lines 6, 16, produced by pump 7 for the fuel injection supply to nozzle 2.

In operation of the fuel pump 7 (Figs. 1 and 3), assuming the plunger 23 is at the bottom of the suction stroke, the inlet ports 24a, 24b will be open and the cylinder 24 filled with fuel. The master rod 30 will have been adjusted longitudinally to cause the rack 29 to have turned the pinion 28a and consequently the plunger 23 so that the groove 23a is out of register with the port 24a and the helical shoulder 23b is set to cause the delivery of fuel to terminate at the end of the predetermined injection period, by establishing a back flow of fuel from the delivery end of the plunger through the groove 23a, clearance 23c and port 24b as it is uncovered by the adjusted helical shoulder 24 on the upward movement of the plunger.

As the plunger proceeds on its pressure stroke from the starting position, it displaces fuel through the ports 24a, 24b until its top edge covers them. When these ports are covered the remaining entrapped fuel is forced out through the non-return delivery valve 25 via the fuel pipe line 6 to the injection nozzle 2. As long as the port 24b is covered the plunger will continue the injection of fuel. Before, however, the plunger reaches the top of the stroke and according to its setting the helical shoulder 23b will have uncovered the port 24b and the residual fuel above the plunger will escape to the suction chamber of the pump via the path above indicated. As a consequence the injection pressure in the pipe line 6 collapses, the valve 25 closes and the injection period is terminated. The plunger continues to the end of its stroke and starts to descend on its suction stroke and as soon as the top of the plunger uncovers the ports 24a, 24b a fresh charge of fuel is sucked in ready for the heat injection period.

When the master control rod 30 has been moved to the right, as seen in Fig. 3, through the range of adjustments of the fuel plunger 23 and helical shoulder 23b for normal running of the engine and the setting is such that injection is prolonged beyond the normal maximum and increased quantities of fuel will then be injected for combustion with the oxygen to be admitted. The groove 32 of the plunger 31 of control pump 20 registers with the port 33 and the plunger idles with a consequent drop in pressure in the lines 18, 17, and relief of pressure on the outer end of the piston 13b permitting the pressure through the branch 16, after actuation of the solenoid valve 16a, to act on the inward end of the piston 13b and open the oxygen valve 13 in synchronism with the fuel injection strokes of the fuel pump 7. Thus both the fuel injection for normal running of the egine and the fuel and oxygen injection for operation under supercharging conditions are controlled by variable adjustment of the master rod 30 and by a connection such as referred to above the switch for acutating the solenoid valve 16a may also be operated automatically as the rod is manipulated to turn the plunger 31 for enabling the oxygen valve 13 to open concurrently with the injection with extra fuel for supercharging and securing the additional power.

Describing the operation of the engine throughout the range of conditions provided for by the engine: ignition takes place automatically under compression in the normal manner under all conditions, and after the power stroke, the exhaust products of combustion are expelled through exhaust valves in the usual manner on the exhaust stroke.

For cruising and other normal running conditions of the engine, i. e. for the normal load range conditions, the air charge for the engine cylinder is aspirated, compressed, the usual quantities of fuel injected, ignited and expanded and exhausted in the normal manner, and under these conditions no oxygen through the valve 13 is admitted to the injection device. When, however, increased (supercharging) power is called for the master rod 30 is manipulated to place it in the supercharging control range. The normal cycle of the engine continues according to ordinary practice, but into the compressed air charge in the cylinders, just before top dead centre, increased fuel and a proportionate quantity (inhibitive of complete combustion) of oxygen under pressure entering through the valve 13 are injected; ignition follows and the period of combined injection continues for a period beyond top dead centre, after which the products of combustion expand in the usual way, followed by the opening of the exhaust on the exhaust stroke. According to this phase of operation of the engine the supplemental oxygen combustion agent for the increased quantity of fuel is adjusted as to (allowing for the oxygen present in the compressed aspirated air charge) relative quantity such that it is insufficient to cause complete combustion of the admitted fuel, with the result that the products of combustion comprise mainly the diatomic gases carbon monoxide and hydrogen. As a consequence of this incomplete combustion the temperature rise due to the use of oxygen is not excessive, as would be the case where oxygen has been aspirated with the air charge temporarily to boost the performance of an engine in known manner.

The relative quantities of fuel and oxygen are determined in setting or tuning of the fuel injection valve and the oxygen valve, as by adjusting the spring loading in reference to the fuel pump injection pressure to give the required relative lifts to the valves.

By a variation of the injection period and the fuel-oxygen ratio different degrees of overload can be achieved as compared with the normal power output, where no oxygen is injected, ranging to as much as four times the normal value.

It will be appreciated that by increasing the power output in the manner described the normal high compression ratio of the engine remains unaffected and therefore the fuel consumption when run at normal load without oxygen remains as low as in the orthodox compression ignition engine.

Further the very large increase in power output is achieved without increasing the maximum cylinder pressure since the additional fuel together with the oxygen is supplied to the cylinder at such a rate that no substantial rise in pressure occurs having regard to the displacement of the piston. There is consequentially therefore no necessity for strengthening any part of the engine in order to achieve overloads according to the invention.

The overloading does not cause a corresponding increase in the mean temperature of the cycle in spite of the use of oxygen for the reason that fuel and oxygen are so adjusted as above indicated to give the substantially incomplete combustion, and no additional thermal strain is imposed on the engine or its cooling system.

In an engine operating according to the invention there is a marked difference between the orthodox combustion of fuel (i. e. injected into the aspirated and compressed air) and the combustion of fuel and oxygen where they are injected together in accurately adjusted quantities. It will be realised that in the latter case the efficiency of combustion will be enhanced by the improved method of mixing and the complete control over the fuel-oxygen ratio during the whole injection period. By complete control of the oxygen/fuel ratio during injection is meant that the ratio is kept constant during injection and following combustion as fuel and oxygen are injected at a constant ratio. The increase in the oxygen concentration in the charge will further result in a reduction of ignition lag or delay.

Oxygen has, of course, already been used in compression ignition engines with the aim of boosting their power output but this has been done by a different method. Oxygen was aspirated together with the air charge and compressed with the charge and no provision was made to achieve substantially incomplete combustion as herein described of the fuel (with the exception of the method in Patent No. 2,376,479 referred to in the opening paragraph hereof) with the consequence that an undesirable rise in temperature occurred, which may only be tolerated for very short periods, and would be quite out of the practical sphere for commercial conditions where the life of an engine is all important.

There are two fundamental methods of increasing the power output of an engine: (a) to increase the speed or (b) to increase the mean effective pressure exercised by the gas forces on the piston. For present purposes the latter only need be discussed.

Comparing the performance of a normal or orthodox compression ignition internal combustion engine and that of an equivalent engine constructed and operating under increased power output according to the invention: the orthodox methods of increasing the mean effective pressure in internal combustion engines are the use of higher compression or of charging at superatmospheric pressure—both methods increase the maximum cylinder pressure, which is undesirable since the latter determines the required mechanical strength and, therefore, weight of the engine. Hence, the real question is how to raise the mean effective pressure without exceeding the maximum permissible cylinder pressure.

For a fixed maximum pressure, the mean effective pressure is proportional to: (1) the amount of sensible heat which can be generated by combustion during one cycle, i. e. the weight of the combustible charge, (2) the amount of work extracted from the sensible heat generated, i. e. the thermal efficiency of the cycle.

In order to attain the highest mean effective pressure, a very large charge of fuel and a correspondingly large content of oxygen are the first requirements, with the following consequences: In the orthodox engine the employment of two-stage compression of air: (1) high pressure of aspirated air, and (2) small compression ratio in order not to exceed the permissible maximum pressure. In an engine according to the invention there is no necessity for the normal type of charging at superatmospheric pressure before compression and the charge is increased after compression by injection of oxygen, and hence there is no necessity for lowering the compression ratio.

Calculations have been made in order to find out the conditions obtaining in both cases when the fuel and oxygen content are increased according to the two methods indicated above. These calculations show that in an engine according to the invention with a fixed compression ratio of 18:1, 90% of the total oxygen can be injected with the fuel during combustion and that this would produce an extreme mean effective pressure of about 800 lbs./sq. in.

In order to charge an orthodox engine with the same heat energy per cycle it would be necessary to reduce the compression ratio to 3·2:1 for the correct fuel/air mixture, and 2·6:1 for a 20% excess of air, because otherwise the maximum cylinder pressure would overstep the permissible limit.

It is impracticable to build such an engine because it would have a very low thermal efficiency under normal working conditions. In contrast with this the engine according to the present invention would attain all the advantages of high efficiency and low fuel consumption running at normal loads without oxygen injection.

These calculations take into account only equal charges of heat energy per cycle in both cases. It can be shown that in extreme load conditions under the method according to the invention the engine is far more efficient than the orthodox engine since it extracts much more useful work from the same amount of heat.

With regard to thermal efficiency the external work done during one cycle is equal to the sum of:

(1) The work during combustion at constant pressure;

(2) The work during adiabatic expansion from which has to be subtracted, (3) The compression work.

Of the three components mentioned the work obtained during constant pressure combustion has the greatest influence on the increase in thermal efficiency. This work may be up to 30% greater for the improved method. Next in influence is the compression work which is up to 35% smaller than for the orthodox process.

The adiabatic expansion work is very nearly the same for both methods in spite of the larger amount, nearly 90%, of diatomic gases in the working substance according to the new method, because of the small adiabatic expansion ratios employed in the supercharged ignition compression engine according to the invention.

It will therefore be appreciated that according to the new method, a mean effective pressure is accomplished which is 50% higher than that obtainable according to the orthodox method of supercharging, assuming the same maximum cylinder pressures in both cases. The orthodox method of supercharging, however, implies a very small compression ratio which, since it cannot be varied, causes a very high fuel consumption when running under normal loads. In consequence the new method achieves a very high power output per unit cylinder volume combined with maximum economy during normal running.

Although the invention has mainly been described as applied to compression ignition engines it may be carried into effect, in a similar manner, with reference to engines employing the lighter hydrocarbon fuels such as gasolene.

We claim:

1. A method of operating a compression ignition internal combustion engine comprising admitting and compressing air and injecting fuel in varying quantities for a power output range throughout which complete combustion affording exhaust gases comprising mainly carbon dioxide, steam and nitrogen is attained and, in order to develop a temporarily increased power output beyond said range, injecting into the cylinder additional fuel and injecting oxygen in amounts controlled in relation to the additional fuel by the automatic operative association of the fuel control with that for the oxygen, such that on ignition substantially incomplete combustion is effected, producing as products thereof mainly the diatomic gases carbon monoxide and hydrogen instead of the said first mentioned gases produced by the engine when running without the injection of oxygen.

2. An internal combustion compression ignition engine producing on the power stroke exhaust gases comprising the products of substantially complete combustion within a power output range afforded by variations in the quantity of fuel injected while maintaining said substantially complete combustion, comprising: a fuel injection nozzle, a fuel injection pump and means for temporarily increasing the said power output range by injecting quantities of fuel additional to such as employed in the output range first mentioned and injecting oxygen in automatically controlled amounts in relation to the said increased quantities of fuel such that on ignition substantially incomplete combustion takes place producing as products thereof mainly the diatomic gases carbon monoxide and hydrogen, said temporarily operated injection means including a valve controlling the supply and cut off of oxygen for injection, a master member under the control of the operator for adjusting the quantities of fuel delivered by said fuel pump, and for determining the opening and closing of the oxygen control valve to cause the injection of oxygen in the said relative amounts.

3. An internal combustion compression ignition engine as claimed in claim 2 wherein the means for temporarily injecting oxygen include hydraulic pressure responsive means operatively connected with the said oxygen valve, a spring tending to close the oxygen valve, a pipe line connection between the fuel pump and the hydraulic pressure responsive means, a hydraulic pressure developing pump, a pipe line connecting the last mentioned pump to the hydraulic pressure responsive means, the said hydraulic pressure acting on the said pressure responsive means in opposition to the injection pressure of the fuel pump, delivery adjustment means actuated by said master member for said hydraulic pump to cause it to deliver hydraulic pressure or to cease delivery, the arrangement being such that with the master member regulated for operation of the engine in the said first mentioned range, the pressure developed by the hydraulic pump causes the oxygen valve to remain closed while with the regulation of the master member for delivery of increased quantities of fuel beyond such as required for said first mentioned range, the said regulation of the master member operates to cause the hydraulic pump to idle and the pressure in the hydraulic pipe line to the hydraulic pressure responsive means to subside, thereby allowing the fuel pump injection pressures to open the oxygen valve against the action of the spring on each injection of fuel through the nozzle for the simultaneous injection of oxygen for the increased power output range.

4. An internal combustion compression ignition engine as claimed in claim 3 wherein the hydraulic pump has a plunger having a longitudinal groove and rotational means are provided for giving rotational displacement to the plunger for positioning said groove with respect to the suction inlet port of the pump to cause the plunger to develop hydraulic pressure during the said first mentioned output range preventing injection of oxygen, or to idle during the increased power output range permitting injection of oxygen under the injection pressures created by the said fuel pump, said rotational means being engaged by the said master member to effect the said displacement.

5. An internal combustion compression ignition engine as claimed in claim 3 wherein the said oxygen valve and the hydraulic pressure responsive means are located in a casing associated with the said fuel injection nozzle and the housing of the injection valve member of the injection nozzle is surrounded by a clearance connected by an oxygen supply duct to the delivery side of the said oxygen valve, the arrangement being such that on the opening of the said oxygen valve oxygen is injected around the fuel injection cone into the cylinder of the engine.

HANS REINHARD FEHLING.
GERHARD FRIEDLANDER.

REFERENCES CITED

The following references are of record in the file of this patent:

UNITED STATES PATENTS

| Number | Name | Date |
| --- | --- | --- |
| 885,820 | Winand et al. | Apr. 28, 1908 |
| 2,191,186 | Amery | Feb. 20, 1940 |
| 2,376,479 | Fehling | May 22, 1945 |